Figure 1:
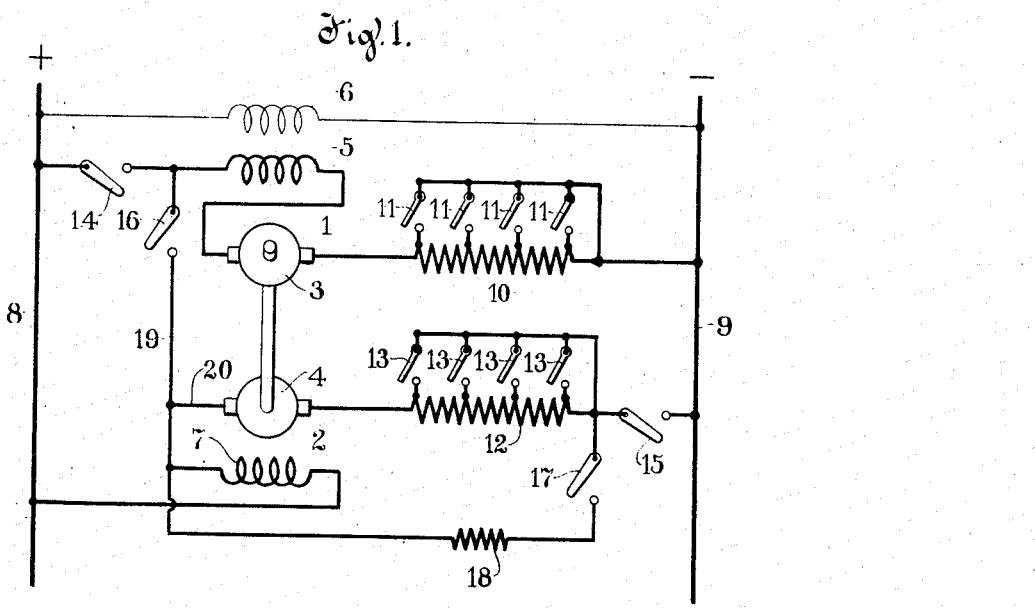

C. T. HENDERSON.
ELECTRIC MOTOR CONTROLLER.
APPLICATION FILED OCT. 2, 1913.

1,134,196.

Patented Apr. 6, 1915.

Witnesses:
J. L. Johnson
Jeanette P. Breck

Inventor
Clark T. Henderson
By Edwin B. H. Tower, Jr.
Attorney

UNITED STATES PATENT OFFICE.

CLARK T. HENDERSON, OF MILWAUKEE, WISCONSIN, ASSIGNOR TO THE CUTLER-HAMMER MFG. CO., OF MILWAUKEE, WISCONSIN, A CORPORATION OF WISCONSIN.

ELECTRIC-MOTOR CONTROLLER.

1,134,196.

Specification of Letters Patent.

Patented Apr. 6, 1915.

Application filed October 2, 1913. Serial No. 793,064.

*To all whom it may concern:*

Be it known that I, CLARK T. HENDERSON, a citizen of the United States, residing at Milwaukee, in the county of Milwaukee and State of Wisconsin, have invented new and useful Improvements in Electric-Motor Controllers, of which the following is a full, clear, concise, and exact description, reference being had to the accompanying drawing, forming a part of this specification.

This invention relates to improvements in electric motor controllers.

In many types of machinery operated by electric motors it is desirable to reduce the motor speed quickly and at a uniform rate regardless of variations in the motor load. Hoisting machinery, elevators, electric cars and electrically driven rolling-mills are illustrative of such machines, although there are many other machines of radically different sorts which it is also desirable to regulate in this manner.

Heretofore, it has been proposed to slow down the driving motors of such machines by connecting a resistance across the motor armature, and varying this resistance. Such an arrangement is, however, wasteful of current and at the same time so reduces the torque that the motor is easily stalled. Furthermore, in cases where two or more driving motors are employed it is necessary to connect a resistance across each motor armature. This renders it difficult to produce a uniform speed reduction in each motor and also requires the use of numerous switches, which it is difficult to coördinate so that they will perform their functions in the desired manner.

An object of the present invention is to provide means which will rapidly and uniformly reduce the motor speed with the consumption of a minimum amount of current.

Another object of the invention is to provide means which will rapidly reduce the motor speed without interfering with the development of sufficient torque to prevent stalling.

Another object of the invention is to provide means which will cause a slowing down of the motor at a uniform rate regardless of the load on the motor.

Another object of the invention is to reduce the number of switches and to avoid complications in the circuit connections of a slow-down controller.

To accomplish these and other objects, the improved controller preferably employs two motors or dynamo electric machines, the capacities of which depend upon the conditions, and in conjunction therewith, employs means whereby one motor may be caused to exert a drag or braking action on the other without interfering with the development of a sufficient torque by the active motor to prevent stalling.

In order to demonstrate the principles of the invention two embodiments have been illustrated in the accompanying drawing; although it is apparent that many other arrangements may be made which fall equally within the scope of the invention.

Figure 2:
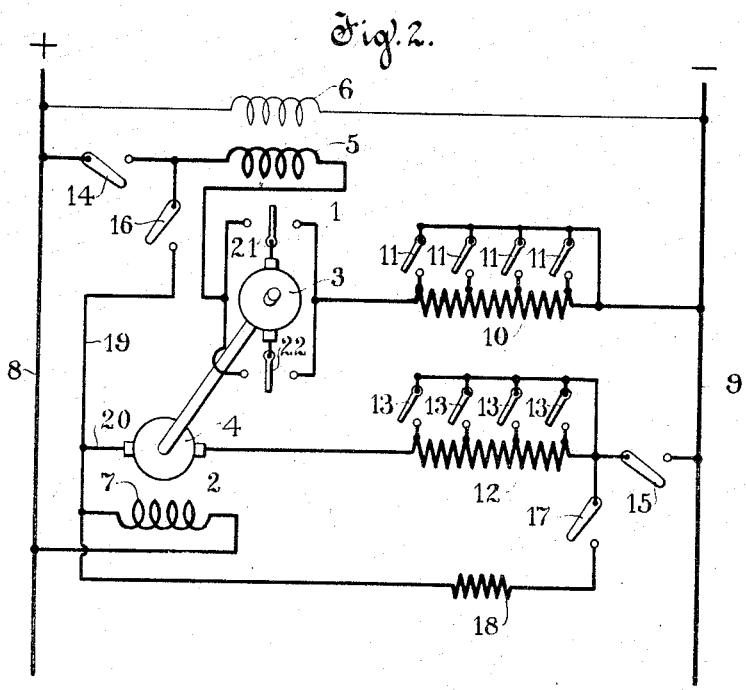

In the drawing—Figure 1 represents diagrammatically one embodiment of the invention; Fig. 2 represents diagrammatically a modification in which provision is made for reversing one of the motors.

Fig. 1 illustrates two motors 1 and 2 with armatures 3 and 4, connected mechanically or otherwise so as to rotate in unison. The motor 1 has a series field 5 and a shunt field 6 while the motor 2 is illustrated as provided only with a series field 7. It is obvious, of course, that other suitable types of motors may be employed. The motors are supplied with current from suitable mains 8 and 9. A starting resistance 10 for motor 1 is controlled by suitable switches 11, and a starting resistance 12 for motor 2 is controlled by switches 13. These starting resistances are preferably arranged to be connected in series with the respective motor armatures and may be short circuited step by step by the switches 11 and 13; although if desired the resistances may be connected in any other preferred manner and controlled by any means to properly perform the desired functions. Main switches 14 and 15 control the motor circuits. A switch 16 controls a cross connection between the series fields of the motors. A switch 17 controls a short circuit including a resistance 18 which may be connected around the armature of motor 2.

The operation of the controller is substantially as follows: The motors are started by closing the main switches 14 and 15 which connect the motors across the line with all the starting resistance in series; the accelerating switches are closed in succession to cut out steps of the resistance to bring the motors up to full speed. The motors being coupled together will exert their combined horse-power to operate the load. To slow down the motors the accelerating switches are first opened, thereupon reintroducing resistances 10 and 12 in circuit and reducing the voltage on the motor terminals. The switch 16 is next closed, thus short circuiting the field of motor 2 and rendering the motor inoperative. A further speed reduction is obtained by opening the switches 14 and 15 and closing the switch 17. The field of motor 2 is thus connected across the line in series with the field 5 from main 8, through field 7, by conductor 19, field 5, armature 3, and resistance 10 to main 9. At the same time the armature 4 is disconnected from the mains and short circuited by the local circuit through conductors 20 and 19, resistance 18, switch 17, and resistance 12. This will produce a dynamic braking effect on motor 2, causing it to exert a drag on motor 1, but as the braking circuit contains the resistances 18 and 12 in series the current will be small and consequently a heavy drag will not be abruptly thrown on the active motor. The braking effect of motor 2 may be further increased by cutting out steps of resistance 12. Inasmuch as the active motor 1 is free to take current from the line in accordance with the voltage across its armature a torque will be maintained ample to take care of any additional load which may be imposed upon the motors.

Fig. 2 illustrates a system similar to that illustrated in Fig. 1. In this figure, however, a reversing switch is provided whereby the compound motor 1 may be operated in either direction. Reversal of motor 1 is effected by means of switches 21 and 22, which control the direction of current through the armature in the customary manner. When the motor 1 is reversed the motor 2 exerts a drag thereon to prevent its speed becoming too great as might be the case, for example, in lowering a load with hoisting machinery.

As the representation of both systems is purely diagrammatic no attempt has been made to illustrate the actual construction of the switches. In practice these may preferably be electro-magnetically operated and controlled by means of a master controller.

The improved controller system permits the motors to be slowed down rapidly and smoothly without an undue waste of current and without reducing the torque of the active motor below that required to operate the load under all conditions. It enables the motor to be operated at a very low speed and to be brought to this low speed very quickly from the full running speed.

In practice, the load conditions vary. Thus at times the normal load may be small and at other times it may be large. Varying load conditions will be automatically taken care of by the controller which will slow down the motors uniformly. This is due to the fact that any tendency of the active motor to slow down more quickly with a heavy load or less quickly with a light load will be counteracted by a corresponding difference in drag exerted by the braking motor.

What I claim as new and desire to secure by Letters Patent of the United States is:

1. In combination, a plurality of electric motors normally coacting to jointly supply power and means for causing one motor to exert a drag on the other for effecting a reduction in the speed of said motors.

2. In combination, a plurality of electric motors, normally coacting to jointly supply power, means connecting the rotors of said motors to insure operation thereof in unison and means for causing one of said motors to exert through said former means a drag on the other of said motors for slowing down said motors.

3. In combination, a plurality of driving motors, series fields therefor, means for causing the rotors of said motors to rotate in unison, means for connecting said series fields in series with each other and a dynamic brake for one of said motors whereby said motor may cause a uniform reduction in the speed of said motors regardless of load conditions.

4. In combination, a plurality of motors, the rotors of which are connected together, and means for slowing down said motors, said means including means for connecting the fields of said motors in series with each other, and means for closing a local circuit including a resistance around the armature of one of said motors.

5. In combination, a plurality of motors, the rotors of which are connected to rotate together, means for connecting the field of one motor across a source of supply independently of the armature of said motor, and means for closing a dynamic braking circuit around said armature.

6. In combination, a plurality of motors, the rotors of which are connected to rotate together, a series field for one of said motors, and means for slowing down said motors, said means including means for connecting the series field of one motor across a source of supply independently of the armature of said motor, and means for closing a local circuit including a resistance around said armature.

7. In combination, a plurality of motors connected in parallel, means for causing the rotors of said motors to rotate in unison, a short circuit including a resistance adapted to be completed around the armature of one motor, means for completing said circuit, and means for connecting the fields of said motors in series with each other.

8. In combination, a plurality of motors connected in parallel, mechanical connections between the rotors of said motors, a resistance adapted to be connected in series with the armature of one of said motors, means for connecting said resistance in local circuit with the armature of said motor, and means for connecting the fields of said plurality of motors in series with each other.

9. In combination, a plurality of motors connected in parallel, a series field for each motor, a starting resistance for each motor, means for causing the rotors of said motors to rotate together, means for connecting said series fields in series with each other and with the armature of one of said motors, means for disconnecting the armature of another of said motors from the line, and means for connecting the armature of said last mentioned motor in a local circuit including a resistance.

10. In combination, a plurality of motors connected in parallel, a series field for each motor, a starting resistance for each motor, means for causing the rotors of said motors to rotate together, means for connecting said series fields in series with each other and with the armature of one of said motors, means for disconnecting the armature of another of said motors from the line, means for connecting the armature of said last mentioned motor in a local circuit including a resistance, and means for varying said resistance.

11. In combination, a compound wound motor, a series motor connected in parallel therewith, means for causing the armatures of said motors to rotate together, means for connecting the field of said series motor in series with the series field of said compound motor, means for disconnecting the armature of said series motor from the line, and means for connecting said last mentioned armature in local circuit with a resistance.

12. In combination, a pair of motors, connected in parallel across supply mains, series fields for said motors, a starting resistance for each motor, means for varying said resistance, means for disconnecting one field from the line and connecting the same in series with the other field, means for disconnecting the armature corresponding to said disconnected field from the line, a resistance, and means for connecting said resistance, said disconnected armature, and its starting resistance in local circuit.

13. In combination, a motor, a second motor connected in parallel therewith, series fields for said motors, means for causing the armatures of said motors to rotate together, and means for reversing the armature current in one of said motors, independently of the other of said motors for the purpose set forth.

14. In combination, a motor, a second motor connected in parallel therewith, series fields for said motors, means for connecting the armatures of said motors to rotate together, means for reversing the armature current in said first motor, means for connecting the series fields of said motors in series with each other, and means for disconnecting the armature of said second motor from the line and connecting the same in local circuit with a resistance.

15. In combination, a motor, a second motor connected in parallel therewith, series fields for said motors, means for connecting the armatures of said motors to rotate together, means for reversing the armature current in said first motor, means for connecting the series fields of said motors in series with each other, and means for disconnecting the armature of said second motor from the line and connecting the same in local circuit with a variable resistance.

In witness whereof, I have hereunto subscribed my name in the presence of two witnesses.

CLARK T. HENDERSON.

Witnesses:
FRANK H. HUBBARD,
JEANETTE S. BROCK.